United States Patent [19]

Honkaniemi et al.

[11] Patent Number: 5,514,331
[45] Date of Patent: May 7, 1996

[54] METHOD AND DEVICE FOR PRODUCING STAINLESS STEEL

[75] Inventors: Matti Honkaniemi; Veikko Juntunen; Jorma Kemppainen; Risto Pellikka; Eero Rättyä, all of Tornio, Finland

[73] Assignee: Outokumpu Steel Oy, Tornio, Finland

[21] Appl. No.: 327,993

[22] Filed: Oct. 24, 1994

[30] Foreign Application Priority Data

Oct. 25, 1993 [FI] Finland ................................ 934698

[51] Int. Cl.$^6$ ................................................ C21C 5/28
[52] U.S. Cl. ...................... 420/71; 148/605; 75/10.66; 266/162; 266/217
[58] Field of Search .......................... 420/71, 129, 115, 420/116; 75/10.66; 266/162, 217; 148/605

[56] References Cited

U.S. PATENT DOCUMENTS 3,947,267  3/1976  d'Entremont et al. ................. 420/71

Primary Examiner—Deborah Yee
Attorney, Agent, or Firm—Brooks Haidt Haffner & Delahunty

[57] ABSTRACT

The invention relates to a method and device for producing stainless steel, comprising methods for creating a ferroalloy, such as ferrochromium, and for further processing the alloy in order to produce a desired stainless steel. According to the invention, the melt obtained from the ferro alloy production unit (1) is transferred at least partly to a ferroalloy processing unit (2) arranged in between the ferroalloy production unit (1) and the stainless steel production unit (5); in the said processing unit (2), the composition of the ferroalloy is adjusted to be suitable for the production of stainless steel.

8 Claims, 1 Drawing Sheet

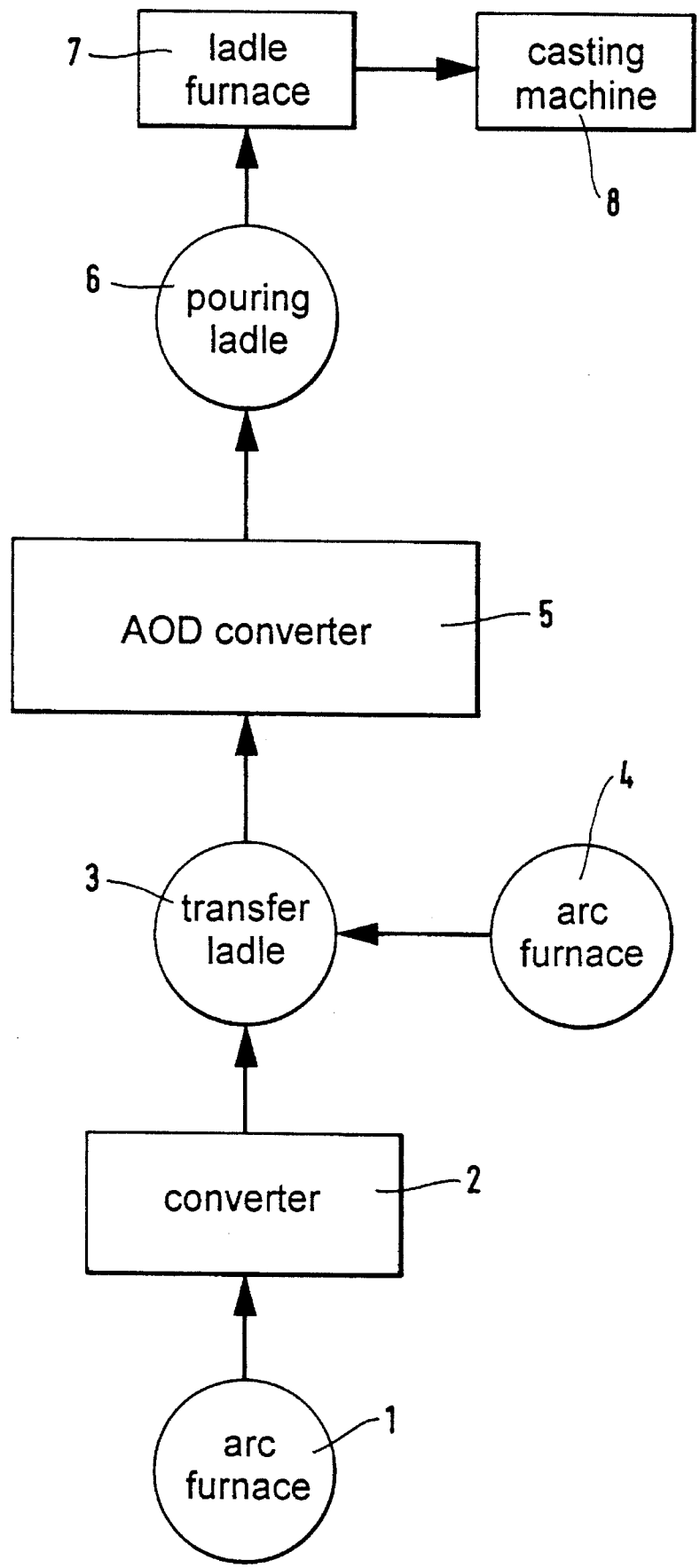

METHOD AND DEVICE FOR PRODUCING STAINLESS STEEL

BACKGROUND OF THE INVENTION

1. Field of the Invention

The invention relates to a method and device for producing stainless steel, when the raw material in the process is a ferroalloy, advantageously ferrochromium.

2. Brief Description of the Prior Art

As main components, stainless steels contain iron and chromium. In order to produce this kind of iron-chromium alloy, i.e. ferrochromium, there can be used oxidic chromite ore, which contains considerable amounts of iron oxides in addition to chromium oxide. In order to create an alloy of iron and chromium, as is described in the JP patent application 57,002,813, there can also be used blast furnace-produced pig iron, whereto chromium is then alloyed in a separate converter. Furthermore, according to the JP patent application 49,067,811, in order to produce an alloy of iron and chromium, i.e. ferrochromium, there can be used iron and chromium ore in given proportions, and the said alloy is then smelted into ferrochromium in the presence of coke and steel scrap.

Apart from iron and chromium, stainless steels contain—depending on the desired properties—for instance nickel. The alloy ingredients are added to the ferrochromium in presmelting, which takes place prior to the production of stainless steel proper, and is carried out for example in an arc furnace. Thereafter the molten stainless steel master alloy is transferred for instance to an AOD converter generally used in stainless steel processes. In the converter, the additional components of the alloy, such as carbon and silicon, are adjusted to the desired level by means of oxygen and argon blasting.

The production of stainless steel requires a lot of energy, particularly electric energy, because the production of ferrochromium needed for stainless steel is mainly carried out in an electric furnace, such as an arc furnace. After smelting in an electric furnace, the ferrochromium must usually be cooled, because the AOD converter employed in the production of stainless steel is possibly located so far from the ferrochromium process, that the transport of molten ferrochromium is not possible. It may also be necessary to carry out the cooling even if the ferrochromium process and the AOD converter were located in the vicinity of each other, because the smelting period of ferrochromium and the AOD converter treatment are essentially different as for their duration.

SUMMARY OF THE INVENTION

The object of the present invention is to eliminate some of the drawbacks of the prior art and to achieve an improved and energy-efficient method and device for producing stainless steel, so that the cooling of the ferroalloy prior to its converting into stainless steel can essentially be avoided altogether.

According to the invention, the melt obtained from the production unit of the ferroalloy used for producing stainless steel is transferred to the processing unit of the ferroalloy, to a preconverting stage, where the composition of the ferroalloy is adjusted to be advantageous for final converting into stainless steel proper. Depending on the composition of the ferroalloy, the content of the components present in the ferroalloy can advantageously be either increased or decreased at the preconverting stage. The content of different components can be varied by feeding into the preconverting stage steel scrap, for instance carbon steel scrap and/or stainless steel scrap.

According to the invention, the ferroalloy obtained from the ferroalloy production is then transferred in molten state into a converter serving as the ferroalloy processing unit, whereto steel scrap is also fed in addition to the ferro-alloy. By means of steel scrap, the composition of the ferro-alloy is adjusted to be advantageous for producing stainless steel. When the ferroalloy is ferrochromium, the chromium content of the alloy is reduced by means of steel scrap. By blasting oxygen into the converter, the silicon and carbon content of the molten ferroalloy is reduced. The heat created in the combustion of silicon and carbon can advantageously be utilized in smelting the steel scrap fed into the converter. From the converter, the diluted ferro-alloy is transferred, in molten state, further to a transfer ladle together with the melt obtained from the electric furnace, the said electric furnace melt being either unalloyed or alloyed with the ingredients needed in stainless steel. From the transfer ladle, the melt is further conducted to the stainless steel production unit, for instance to an AOD converter.

When using the method and device of the invention, the ferroalloy production and the stainless steel production are combined in an advantageous fashion. By treating the molten ferroalloy in a separate converter prior to the final converting into stainless steel, the time needed for the converting into stainless steel can also be shortened. The shortening of the time needed for the final converting results from the fact that the silicon and carbon contents of the melt were already reduced in the ferroalloy processing unit. Thus the need for scrap serving as cooling material is essentially lower in the final converting. As the proportion of scrap is reduced, the contents of carbon and silicon, which are both at least partly removed in the final converting, are essentially lower.

When producing stainless steel according to the method of the present invention, the number of converting periods for instance within twenty-four hours can be increased owing to the shortening of the converting period. Consequently, the production of stainless steel is advantageously increased, which further improves the energy-efficiency of the method.

Moreover, when using the method and device of the invention, the product treatment expenses in the ferroalloy production can also be cut, and the amount of finely divided ferroalloy can be reduced, because all of the ferroalloy can essentially be treated as melt. The transport costs of molten ferroalloy also are low, because separate intermediate storages are not required. It is advantageous of the method of the invention that essentially all of the produced ferroalloy can be transferred to the preconverting stage in molten state.

BRIEF DESCRIPTION OF THE DRAWING

The drawing is a schematic illustration of a preferred embodiment of the invention.

According to the drawing, the ferrochromium used in the production of stainless steel is smelted in an arc furnace 1, wherefrom the molten ferrochromium is transferred to a preconverting stage according to the invention, taking place in the ferrochromium converter 2. Into the ferrochromium converter 2, there is also fed steel scrap and/or alloy steel scrap and flux. In the converter 2, the converting blasting is carried out with some oxygen-bearing gas, so that the scrap fed into the converter is smelted by means of the chemical energy from carbon and silicon contained in the molten ferrochromium and partly removed in the converting. From the ferrochromium converter 2, the melt and the ferrochromium diluted in chromium content are transported to a transfer ladle 3 to wait for the alloy coming from the second arc furnace 4. In the arc furnace 4, there is smelted, in addition to steel scrap, also raw materials of other metals, such as nickel, used in the production of stainless steel, for instance ferronickel or cathode nickel. The smelting product from the arc furnace 4 is transported to the transfer ladle 3, where it, together with the ferrochromium with a diluted chromium content, forms a master alloy for stainless steel. From the transfer ladle 3, the master alloy is fed into the AOD converter 5. Into the AOD converter 5, there is fed, in addition to the master alloy, also flux as well as steel scrap and alloy ingredients as cooling agents. The converting blasting in the AOD converter is carried out with oxygen and an inert gas, i.e. argon. By means of the oxygen, the carbon content in the melt is adjusted to a desired level. During the oxygen blasting, the sulphur contained in the melt also is removed by means of slagging. Argon is used for preventing the oxidation of easily oxidized alloy ingredients and for mixing the melt. From the AOD converter 5, the molten stainless steel is poured to a pouring ladle 6 and transferred to a ladle furnace 7 and further to a continuous casting machine 8 in order to produce blanks.

EXAMPLE

According to the invention, 680 kg molten ferrochromium obtained from an arc furnace and containing 52% by weight chromium, 7% by weight carbon and 4% by weight silicon, was fed into a ferrochromium converter. In addition to this, into the ferrochromium converter there was fed 320 kg carbon steel scrap with a carbon content of 0.7% by weight, as well as flux per each ton of diluted ferrochromium to be produced. The converting blasting was carried out with oxygen-enriched air, so that by means of the energy created in the combustion of carbon and silicon contained in the ferrochromium, the carbon steel scrap fed into the ferrochromium converter was smelted. Thus all of the silicon contained in the ferrochromium was recovered in the slag, and the major part of the carbon was discharged in the gas phase. Now a ton of ferrochromium, diluted in chromium content, obtained from the ferrochromium converter contained 35% by weight chromium and 2.5% by weight carbon. This diluted ferrochromium was transferred to a transfer ladle. Into the transfer ladle, there was also fed from the second arc furnace a nickel-bearing melt, essentially equal in weight, which contained 13% in weight nickel and a some chromium. In the transfer ladle there was now created a master alloy for stainless steel, containing 19% by weight chromium, 6.6% by weight nickel and 1.5% by weight carbon. This master alloy was further fed into an AOD converter, where the rest of the carbon was burnt, and for the cooling of the converter melt there was used steel scrap and alloy ingredients so that from the AOD converter, there was obtained a molten metal suited for stainless 18/8 steel (18% by weight chromium and 8% by weight nickel).

We claim:

1. A method for producing stainless steel comprising creating a ferrochromium alloy and processing the ferrochromium alloy to produce an alloy suitable for stainless steel production, including the steps of:

(a) melting ferrochromium in a furnace;

(b) transferring ferrochromium melt from the furnace to a preconverter and adjusting the composition of the ferrochromium;

(c) melting other metals used in stainless steel production in a furnace to produce a smelting product; and (d) transferring the ferrochromium from the preconverter and the smelting product in a transfer ladle to a converter for producing stainless steel.

2. The method of claim 1 including utilizing the combustion heat of silicon and carbon continued in the ferrochromium in adjusting the composition of the ferrochromium in step (b).

3. The method of claim 1 or 2 including using melted steel scrap for adjusting the composition of the ferrochromium in step (b).

4. The method of claim 1 including reducing the chromium content of the ferrochromium in step (b).

5. The method of claim 2 including reducing the chromium content of the ferrochromium in step (b).

6. The method of claim 3 including reducing the chromium content of the ferrochromium in step (b).

7. Apparatus for producing stainless steel comprising in combination a ferrochromium production furnace for producing molten ferrochromium, a preconverter for adjusting the composition of molten ferrochromium produced in the ferrochromium production furnace, a furnace for melting other metals used in stainless steel production to produce a smelting product, a converter for producing stainless steel and transfer ladle means for transferring ferrochromium from said preconverter and said smelting product from said furnace to said converter.

8. Apparatus according to claim 7 wherein the preconverter is an oxygen blasting preconverter.

* * * * *